US012616895B2

(12) United States Patent　　　　　(10) Patent No.:　US 12,616,895 B2
Zhan　　　　　　　　　　　　　　　　(45) Date of Patent:　　May 5, 2026

(54) CHESSBOARD TOY

(71) Applicant: Yuexin Zhan, Chaozhou (CN)

(72) Inventor: Yuexin Zhan, Chaozhou (CN)

( * ) Notice: Subject to any disclaimer, the term of this patent is extended or adjusted under 35 U.S.C. 154(b) by 0 days.

(21) Appl. No.: 19/428,039

(22) Filed: Dec. 19, 2025

(65) Prior Publication Data

US 2026/0115582 A1　　Apr. 30, 2026

(30) Foreign Application Priority Data

Nov. 27, 2025　(CN) .......................... 202522530928.7

(51) Int. Cl.
　　*A63F 9/24*　　　(2006.01)
　　*A63F 3/00*　　　(2006.01)
　　*A63F 3/02*　　　(2006.01)
　　*A63F 13/21*　　(2014.01)
　　*A63F 13/24*　　(2014.01)
(52) U.S. Cl.
　　CPC ............ *A63F 9/24* (2013.01); *A63F 3/00643* (2013.01); *A63F 3/02* (2013.01); *A63F 13/24* (2014.09); *A63F 2003/00646* (2013.01); *A63F 2003/00652* (2013.01); *A63F 2003/00662* (2013.01); *A63F 2003/00678* (2013.01); *A63F 3/00694* (2013.01); *A63F 2009/2401* (2013.01); *A63F 13/21* (2014.09)

(58) Field of Classification Search
　　CPC .......... A63F 9/24; A63F 3/00643; A63F 3/02;
　　　　　　　A63F 3/00694; A63F 13/24; A63F 13/21;
　　　　　　　A63F 2003/00646; A63F 2003/00652;
　　　　　　　A63F 2003/00662; A63F 2003/00678;
　　　　　　　　　　　　　　　　　A63F 2009/2401
　　See application file for complete search history.

(56) References Cited

U.S. PATENT DOCUMENTS

| | | | | |
|---|---|---|---|---|
| 3,127,174 | A * | 3/1964 | Ryan | A63F 3/00075 |
| | | | | 273/265 |
| 6,431,548 | B1 * | 8/2002 | Voigt, IV | A63F 9/0406 |
| | | | | 273/287 |
| 7,780,513 | B2 * | 8/2010 | Lin | A63F 3/00643 |
| | | | | 273/443 |
| 9,511,277 | B2 * | 12/2016 | Wouhaybi | A63F 3/00006 |
| 10,573,473 | B2 * | 2/2020 | Wu | A63F 13/24 |
| 11,161,032 | B2 * | 11/2021 | Roehrig | A63F 3/00261 |
| 11,351,443 | B2 * | 6/2022 | McCoy | A63F 3/00694 |
| 11,986,741 | B1 * | 5/2024 | Young | A63F 3/00895 |
| 12,544,648 | B2 * | 2/2026 | Yu | A63F 3/00694 |
| 2004/0094894 | A1 * | 5/2004 | Lertdee | A63F 3/00214 |
| | | | | 273/287 |

(Continued)

*Primary Examiner* — William H Mcculloch, Jr.

(57)　　　　　　ABSTRACT

A chessboard toy is provided. A first driving coil is arranged on an inner ring of a knob, and a second driving coil is arranged on a rotating member; and the first driving coil and the second driving coil mesh with each other, so that a rotation sensing member can be controlled by direct mechanical transmission; mechanical motion of the knob can be converted into an electrical signal of the rotation sensing member; and use of a light sensing mechanism or a magnetic sensing mechanism is avoided. Therefore, structural complexity and a fault rate are reduced. In addition, compared with the light sensing mechanism and the magnetic sensing mechanism that have high costs, a technical solution can also significantly reduce production and manufacturing costs.

10 Claims, 12 Drawing Sheets

(56) References Cited

U.S. PATENT DOCUMENTS

| 2015/0014930 A1 | 1/2015 | Summerville, Jr. |
| 2022/0323852 A1 | 10/2022 | Farmer |
| 2024/0108970 A1 | 4/2024 | Liao |
| 2025/0099843 A1* | 3/2025 | Young ................. A63F 3/00895 |

* cited by examiner

10

10

CHESSBOARD TOY

TECHNICAL FIELD

The present disclosure relates to the field of toys, and in particular, to a chessboard toy.

BACKGROUND

Chessboard type electronic toys or educational equipment (such as electronic chess, Go, and logic training boards) often require users to select specific positions on a chessboard for operation. At present, a mainstream interaction manner for position selection mainly adopts a knob:

The knob style scheme is usually to control a cursor to move through a rotation component or a knob like component sleeved outside an equipment housing. A user can rotate the knob to change a selected position. However, in order to accurately convert a manual rotation action of the user into an equipment-recognizable electrical signal (such as a coordinate change) and achieve smooth movement of the cursor on a two-dimensional chessboard, this scheme often forms a recognizable electrical signal through a light sensing mechanism or a magnetic sensing mechanism. This directly leads to structural complexity of a product and further increases a fault rate.

SUMMARY

The present disclosure provides a chessboard toy which can solve the problems of high manufacturing costs and a high fault rate.

The present disclosure provides a chessboard toy, including:

a housing;

a knob rotatably arranged on the housing, wherein an outer ring of the knob is exposed out of the housing; an inner ring of the knob is provided with a first driving coil and is exposed inside the housing; and a sensing feedback device including a circuit board, a rotation sensing member, a rotation member, and a screen display assembly, wherein the circuit board is arranged inside the housing; the rotation sensing member is arranged inside the housing and is electrically connected to the circuit board; the rotation member is rotatably connected to an input end of the rotation sensing member; the rotation member is provided with a second driving coil which meshes with the first driving coil; the screen display assembly is electrically connected to the circuit board and is exposed out of the housing; and when the knob is rotated, the first driving coil drives the second driving coil to rotate, so that the second driving coil drives the rotation member to rotate, and then the rotation sensing member outputs an electrical signal to the circuit board through the rotation member.

Preferably, the first driving coil includes a first tooth ring; the second driving coil includes a second tooth ring; the first tooth ring meshes with the second tooth ring.

Preferably, the first driving coil includes a first annular wave pattern; the second driving coil includes a second annular wave pattern; and the first annular wave pattern meshes with the second annular wave pattern.

Preferably, the housing is provided with an annular slot; an avoidance hole is formed in a slot wall of the annular slot; the knob includes an outer ring portion and an inner ring portion; the first driving coil is arranged on the inner ring portion; the outer ring portion is connected to the inner ring portion; the outer ring portion is exposed out of the housing; the inner ring portion is inserted into the annular slot; and the first driving coil is at least partially exposed in the avoidance hole to mesh with the second driving coil.

Preferably, the screen display assembly includes a light guide member, a transmitting plate, and a plurality of light-emitting diodes (LEDs); the LEDs are respectively arranged on the circuit board; the light guide member is arranged on the circuit board and covers the LEDs; and the transmitting plate is arranged on the housing and blocks the light guide member.

Preferably, the LEDs are uniformly distributed; a plurality of light guide channels are formed in the light guide member; the light guide channels are aligned with the LEDs in a one-to-one correspondence manner; each LED is exposed inside each light guide channel; and the transmitting plate blocks end portions of the light guide channels.

Preferably, the housing includes a bottom shell, an upper cover, and a limiting ring; the upper cover is arranged on the bottom shell; the upper cover and the bottom shell are jointly enclosed to form a storage cavity; the rotation member is located in the storage cavity;

a boss is arranged on a surface of the upper cover that is away from the bottom shell; a mounting hole is formed in the boss; the circuit board is arranged on the boss and is at least partially exposed inside the mounting hole; the knob is sleeved on the boss; the limiting ring is located on the circuit board; the screen display assembly is located inside the limiting ring; a connection column of the screen display assembly is threaded in the circuit board and is connected to the upper cover; the screen display assembly resists against the limiting ring; and the limiting ring resists against the circuit board and is clamped with the screen display assembly.

Preferably, the rotation sensing member includes an encoder; a driving shaft is arranged on the rotation member; and the driving shaft is inserted into an input end of the encoder.

Preferably, the chessboard toy further includes a control device; the control device includes a control switch and a button; the control switch is arranged on the circuit board; the button is slidably arranged on the housing or the screen display assembly; and the button movably resists against the control switch.

Preferably, the chessboard toy further includes a response device; the response device includes a response sliding column and a reset spring; the response sliding column is slidably arranged on the housing; the reset spring is sleeved on the response sliding column; and the reset spring is configured to provide a force to drive the response sliding column to slidably resist against the first driving coil.

Preferably, the response sliding column is located inside the housing; a response hole is formed in the housing; the response hole is aligned with the first driving coil; and the response sliding column is threaded in the response hole.

Preferably, the control device includes a plurality of control switches and a plurality of buttons; the control switches are arranged on the circuit board; the buttons are respectively slidably arranged on the housing; the buttons movably resist against the control switches in a one-to-one correspondence manner;

the circuit board is provided with a game mode switching module; the game mode switching module is electrically connected to the screen display assembly;

at least one of the control switches is configured as a function switch; and the function switch is electrically connected to the game mode switching module.

The present disclosure has the following beneficial effects:

The present disclosure relates to the chessboard toy. The first driving coil is arranged on the inner ring of the knob, and the second driving coil is arranged on the rotating member; and the first driving coil and the second driving coil mesh with each other, so that the rotation sensing member can be controlled by direct mechanical transmission; mechanical motion of the knob can be converted into an electrical signal of the rotation sensing member; and use of a light sensing mechanism or a magnetic sensing mechanism is avoided. Therefore, structural complexity and a fault rate are reduced. In addition, compared with the light sensing mechanism and the magnetic sensing mechanism that have high costs, a technical solution can also significantly reduce production and manufacturing costs.

BRIEF DESCRIPTION OF THE DRAWINGS

The exemplary implementations of the present disclosure will be described in more details by combining the accompanying drawings. The above and other objectives, features, and advantages of the present disclosure will become more obvious. In the exemplary implementations of the present disclosure, the same reference numerals generally represent the same components.

DETAILED DESCRIPTION OF THE EMBODIMENTS

Figure 1:
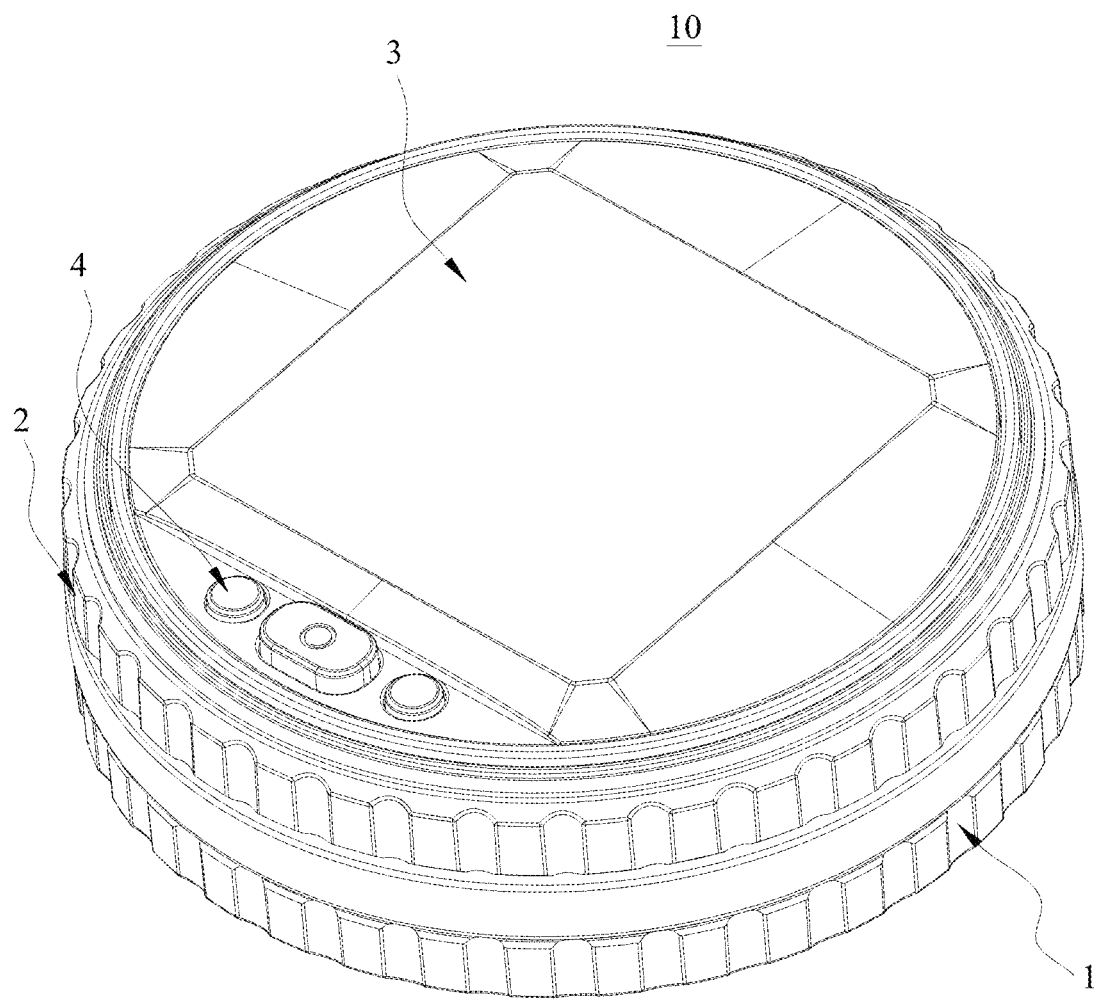
FIG. 1 is a schematic structural diagram of a chessboard toy in some embodiments of the present disclosure.

The implementations of the present disclosure will be described in more details below with reference to the accompanying drawings. Although the accompanying drawings show the exemplary implementations of the present disclosure, it should be understood that the present disclosure can be implemented in various forms, and should not be limited to the implementations stated herein. Rather, these implementations are provided for understanding the present disclosure more thoroughly and completely, and can completely transfer the scope of the present disclosure to those skilled in the art.

It should be understood that although various information may be described using terms such as "first", "second", and "third" in the present disclosure, such information should not be limited to these terms. These terms are only used to distinguish information of the same type from each other. For example, without departing from the scope of the present disclosure, the first information can also be referred to as the second information, and similarly, the second information can also be referred to as the first information. Thus, features defined as "first" and "second" explicitly or implicitly include one or more of the features. In the description of the present disclosure, "plurality" means two or more, unless otherwise expressly and specifically defined.

In the descriptions of the present disclosure, it should be understood that orientations or positional relationships indicated by the terms "length", "width", "upper", "lower", "front", "rear", "left", "right", "vertical", "horizontal", "top", "bottom", "inner", "outer", and the like are orientations or positional relationships as shown in the drawings, and are only for the purpose of facilitating and simplifying the descriptions of the present disclosure instead of indicating or implying that devices or elements indicated must have particular orientations, and be constructed and operated in the particular orientations, so that these terms are not construed as limiting the present disclosure.

Unless otherwise expressly specified and limited, the terms "mount", "connect", "connection", "fix" the like should be understood in a broad sense, such as, a fixed connection, a detachable connection, an integrated connection, a mechanical connection, an electrical connection, a direct connection, an indirect connection through an intermediate medium, an internal communication of two elements, or interaction between two elements. For those of ordinary skill in the art, the specific meanings of the aforementioned terms in the present disclosure can be understood based on specific conditions.

Figure 2:
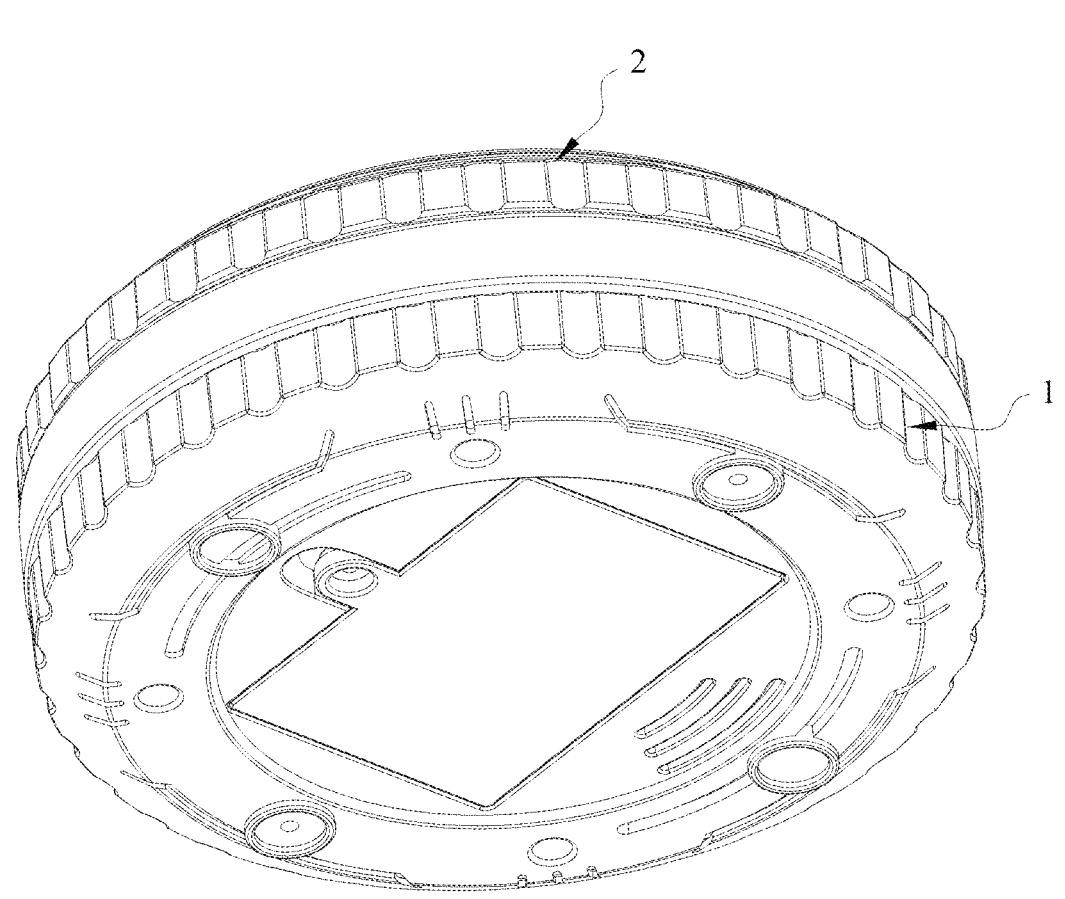
FIG. 2 is a schematic structural diagram of the chessboard toy shown in FIG. 1, viewed in another angle.

FIG. 1 and FIG. 2 show a chessboard toy 10 in some embodiments of the present disclosure, including a housing 1, a knob 2, and a sensing feedback device 3. The knob 2 is rotatably arranged on the housing 1. The sensing feedback device 3 is arranged on the housing 1 and is in driving connection to the knob 2.

It can be understood that the housing 1 not only achieves an effect of supporting the rotation of the knob 2, but also provides a mounting position for the sensing feedback device 3. On the one hand, the knob 2 is configured for being operated by a user to rotate on the housing 1, and on the other hand, the knob 2 is further configured to transmit a torque inputted by the user to the sensing feedback device 3. The sensing feedback device 3 is configured to convert the torque inputted by the user into an electrical signal and provide corresponding feedback based on the electrical signal.

As shown in FIG. 1 to FIG. 10, An outer ring of the knob 2 is exposed out of the housing 1. An inner ring of the knob 2 is provided with a first driving coil 23 and is exposed inside the housing 1.

The sensing feedback device 3 includes a circuit board 31, a rotation sensing member 32, a rotation member 33, and a screen display assembly 34. The circuit board 31 is arranged inside the housing 1. The rotation sensing member 32 is arranged inside the housing 1 and is electrically connected to the circuit board 31. The rotation member 33 is rotatably connected to an input end of the rotation sensing member 32. The rotation member 33 is provided with a second driving coil 331 which meshes with the first driving coil 23. The screen display assembly 34 is electrically connected to the circuit board 31 and is exposed out of the housing 1.

When the knob 2 is rotated, the first driving coil 23 drives the second driving coil 331 to rotate, so that the second driving coil 331 drives the rotation member 33 to rotate, and then the rotation sensing member 32 outputs an electrical signal to the circuit board 31 through the rotation member 33.

It can be understood that the outer ring of the knob 2 is for manual operation by the user, and the entire knob 2 can be rotated on the housing 1 through the outer ring. The inner ring of the knob 2 is exposed inside the housing 1, and the first driving coil 23 on the inner ring is configured to transmit the torque to the second driving coil 331 that meshes with the first driving coil 23.

The circuit board 31 is an existing art, on which a corresponding circuit is soldered and a corresponding circuit element is arranged. The rotation sensing member 32 can be configured as various parts in the existing art that can convert mechanical rotation into electrical signals, depending on an ability of generating a corresponding electrical signal under the driving of the rotation member 33. The rotation member 33 can be configured to be arranged on the housing 1 through a rotating shaft or another rotatable connection structure in the existing art. The rotation member 33 is configured to receive, through the second driving coil 331, the torque transmitted from the first driving coil 23 on the knob 2, so that the rotation member 33 can rotate under the driving of the knob 2. In another aspect, the rotation member 33 is also configured to input the torque to an input end of the rotation sensing member 32 during rotation, thereby generating a corresponding electrical signal through the rotation sensing member 32. The screen display assembly 34 is configured to operate under the driving of the circuit board 31, thereby presenting predetermined visual feedback.

It should be noted that the user can manually drive the knob 2 to rotate, and the first driving coil 23 on the knob 2 can rotate synchronously. Since the first driving coil 23 and the second driving coil 331 are kept meshing with each other, the first driving coil 23 can drive the rotation member 33 to rotate. During rotation, the rotation member 33 can continuously transmits power to the input end of the rotation sensing member 32. Subsequently, the rotation sensing member 32 can generate the corresponding electrical signal to the circuit board, and the circuit board can control the screen display assembly 34 to provide the corresponding visual feedback based on the electrical signal. Certainly, a sound feedback element such as a speaker can be added, so that the circuit board can control the sound feedback element to provide predetermined sound feedback based on different electrical signals.

Specifically, the rotation sensing member 32 includes an encoder. A driving shaft 332 is arranged on the rotation member 33. The driving shaft 332 is inserted into an input end of the encoder.

It can be understood that when the encoder is used as the rotation sensing member 32, it is configured to convert a mechanical rotation displacement (including an angle, a speed, and a direction) inputted by the rotation member 33 into a digital pulse signal or an analog electrical signal, thereby improving feedback accuracy when the user rotates the knob, achieving precise capturing on a small rotation amplitude and a rotation direction of operation on the knob 2, improving positioning accuracy of chessboard operations (such as chess piece movement and menu selection), and avoiding operational misidentification.

Specifically, the first driving coil 23 includes a first tooth ring. The second driving coil 331 includes a second tooth ring. The first tooth ring meshes with the second tooth ring.

It can be understood that the first tooth ring includes a plurality of teeth for meshing, and the second tooth ring also includes a plurality of teeth for meshing. In this way, the meshing between the first driving coil 23 and the second driving coil 331 can be achieved, thereby implementing the transmission of the torque between them.

Specifically, the first driving coil 23 includes a first annular wave pattern. The second driving coil 331 includes a second annular wave pattern. The first annular wave pattern meshes with the second annular wave pattern.

It can be understood that the first wave pattern means that a surface contour of a portion of the first driving coil 23 for transmission is wavy, and in the same way, the second wave pattern means that a contour of a corresponding portion of the second driving coil 331 is wavy.

As shown in FIG. 3 and FIG. 6 to FIG. 8, in some embodiments of the chessboard toy 10, an annular slot 11 is formed in the housing 1, and an avoidance hole 111 is formed in a slot wall of the annular slot 11.

The knob 2 includes an outer ring portion 21 and an inner ring portion 22. The first driving coil 23 is arranged on the inner ring portion 22. The outer ring portion 21 is connected to the inner ring portion 22. The outer ring portion 21 is exposed out of the housing 1. The inner ring portion 22 is inserted into the annular slot 11. The first driving coil 23 is at least partially exposed in the avoidance hole 111 to mesh with the second driving coil 331.

It can be understood that the annular slot 11 is configured to accommodate the inner ring portion 22 of the knob 2, thus providing rotation guidance while also preventing the knob 2 from being detached from the housing 1. Due to the formation of the avoidance hole 111, the first driving coil 23 is at least partially exposed inside the housing during rotation, and meshes with the second driving coil 331 through the exposed portion. The outer ring portion 21 is configured to enlarge an operation contact plane of the user, to improve convenience of applying force during manual rotation of the knob 2. Further, antiskid lines 211 can be arranged on the outer ring portion 21 to prevent slipping during operation. The inner ring portion 22 is configured to: connect the outer ring portion 21 to the first driving coil 23 and transmit the torque received by the outer ring portion 21 to the first driving coil 23.

It should be noted that the precise guidance performed on the knob 2 through the annular slot 11 and the exposure of a meshing region through the avoidance hole 111 ensure stability of a torque transmission path, thereby ensuring reliability of operational feedback.

It should be also noted that the outer ring portion 21, the inner ring portion 22, and the first driving coil 23 can be configured to be integrally formed and manufactured together, or they can be connected through insertion, bonding, clamping, or fusion after being separately manufactured.

Figure 3:
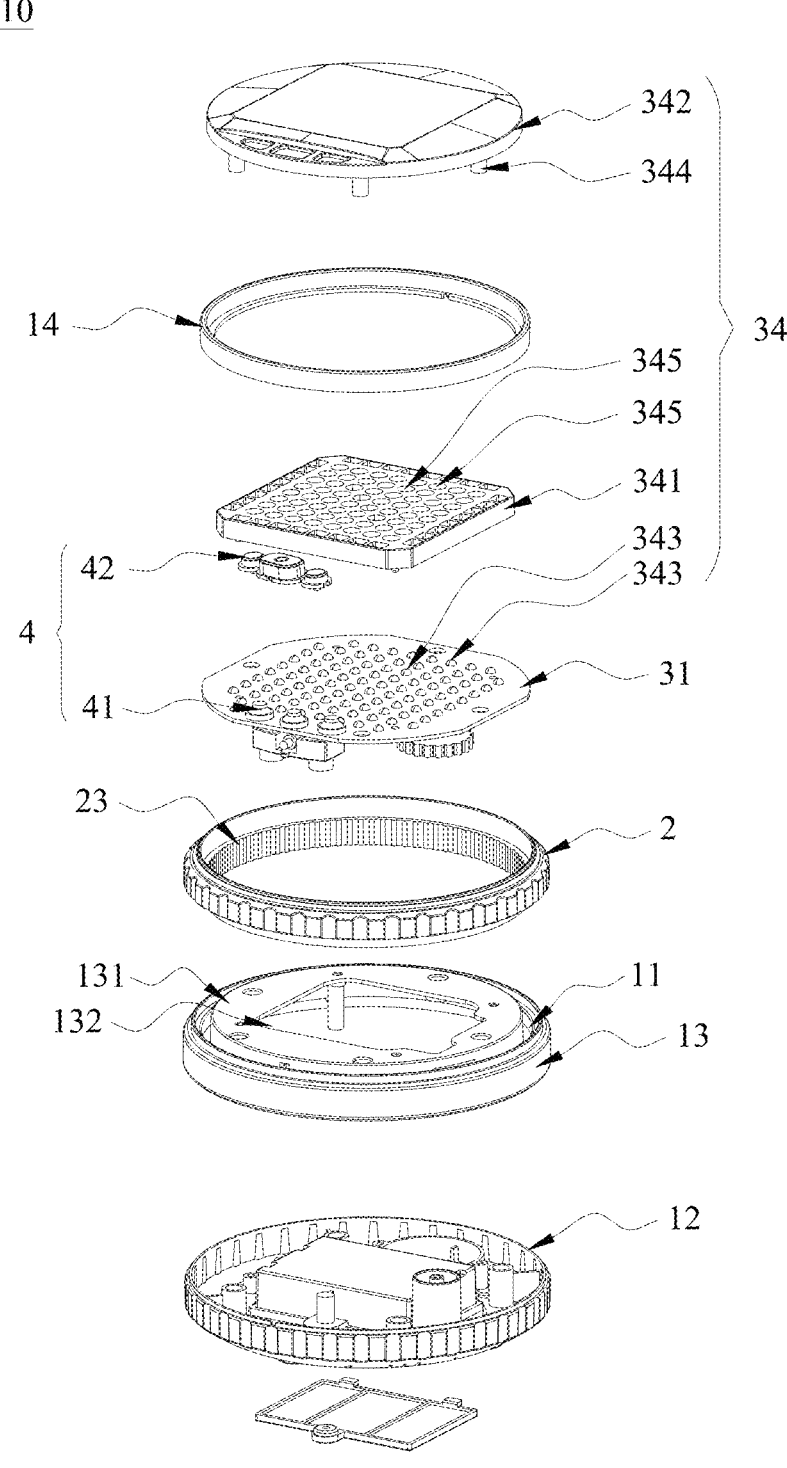
FIG. 3 is an exploded diagram of a chessboard toy in some embodiments of the present disclosure.
Figure 6:
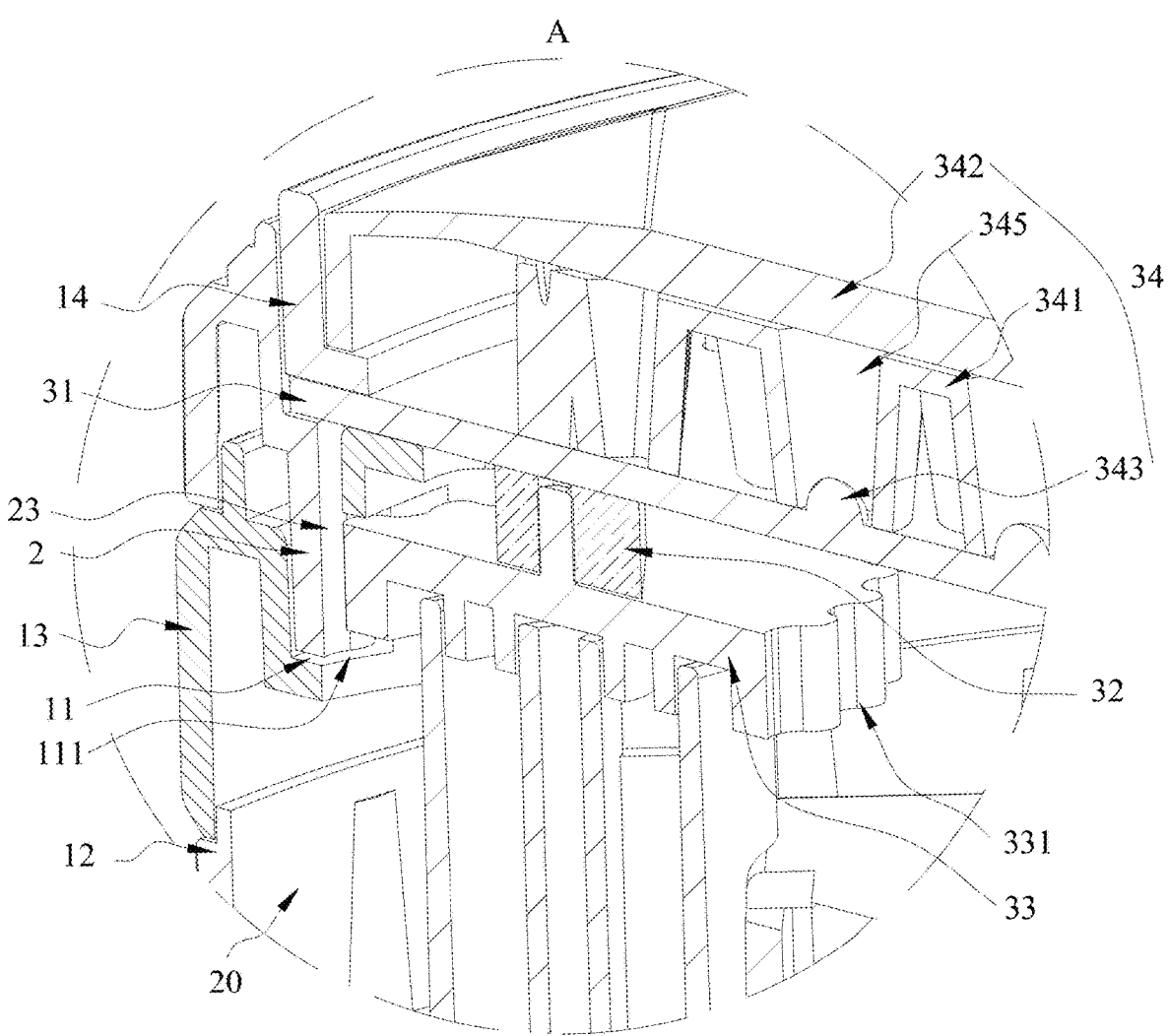
FIG. 6 is an enlarged view of part A of the chessboard toy shown in FIG. 5.
Figure 7:
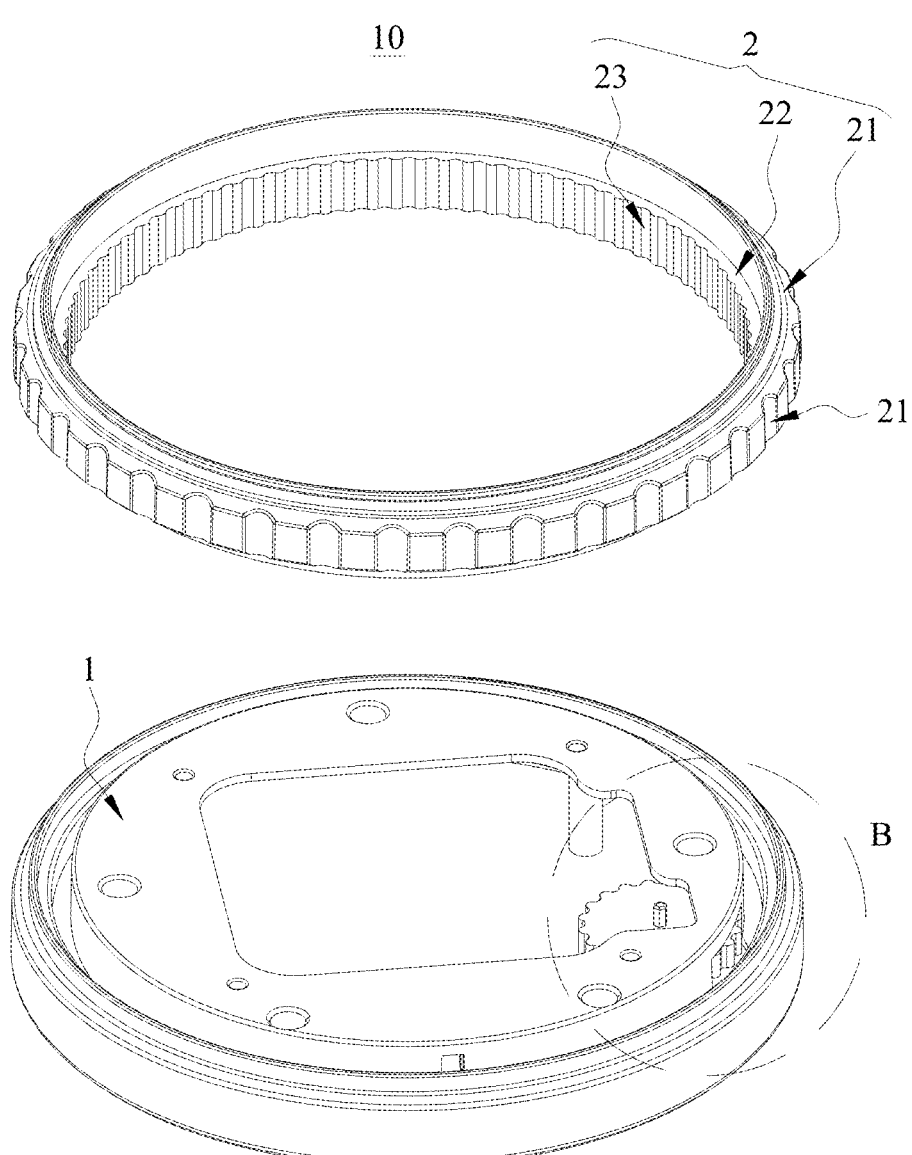
FIG. 7 is a partially schematic structural diagram of a chessboard toy in some embodiments of the present disclosure.
Figure 8:
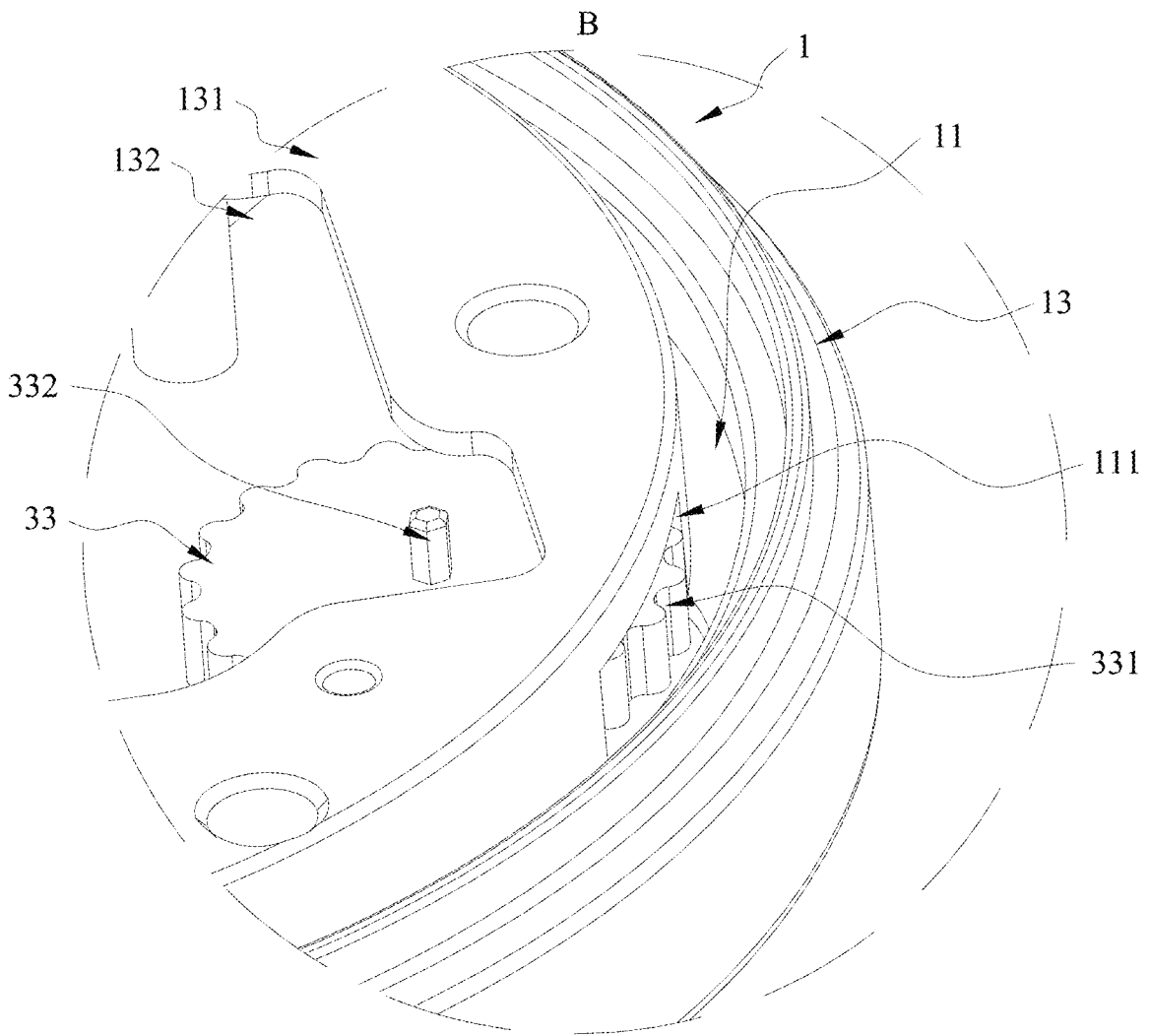
FIG. 8 is an enlarged view of part B of the chessboard toy shown in FIG. 7.

As shown in FIG. 3 and FIG. 6, in some embodiments of the chessboard toy 10, the screen display assembly 34 includes a light guide member 341, a transmitting plate 342, and a plurality of LEDs 343. The LEDs 343 are respectively arranged on the circuit board 31. The light guide member 341 is arranged on the circuit board 31 and covers the LEDs 343. The transmitting plate 342 is arranged on the housing 1 and blocks the light guide member 341.

It can be understood that the LEDs 343 are configured to emit light under the control of the circuit board 31, to generate a basic light source. The light guide member 341 is configured to cover the LEDs 343 and direct and diffuse the light emitted by the LEDs 343 to a predetermined region on the transmitting plate 342. The transmitting plate 342 is configured to physically protect the light guide member 341 and the LEDs 343, while transmitting the light diffused by the light guide member 341, thereby forming, on the transmitting plate 342, light feedback that can be observed by the user.

It should be noted that due to the directing and diffusing effect of the light guide member 341 on the LEDs 343, in conjunction with the protection and light transmission characteristics of the transmitting plate 342, uniform illumination and clear visual information outputting of a display area of the chessboard toy 10 are implemented, and an assembly failure caused by external mechanical damage is avoided.

As shown in FIG. 6, in some embodiments of the chessboard toy 10, the LEDs 343 are uniformly distributed. A plurality of light guide channels 345 are formed in the light guide member 341. The light guide channels 345 are aligned with the LEDs 343 in a one-to-one correspondence manner. Each LED 343 is exposed inside each light guide channel 345. The transmitting plate 342 blocks end portions of the light guide channels 345.

It can be understood that each light guide channel 345 is configured to constrain a light propagation path of each LED 343, to reduce cross interference of light of adjacent LEDs 343. The alignment between the LEDs 343 and the light guide channels 345 is configured to confine point light sources within independent channels, so that a final image is clearer and more distinct.

It should be noted that the physical isolation on a light path of each LED 343 through the light guide channel 345 significantly reduces light crosstalk, thus ensuring light spot uniformity and color independence in the display area. The sealing and blocking of the transmitting plate 342 further ensure long-term reliability of an optical assembly.

Figure 4:
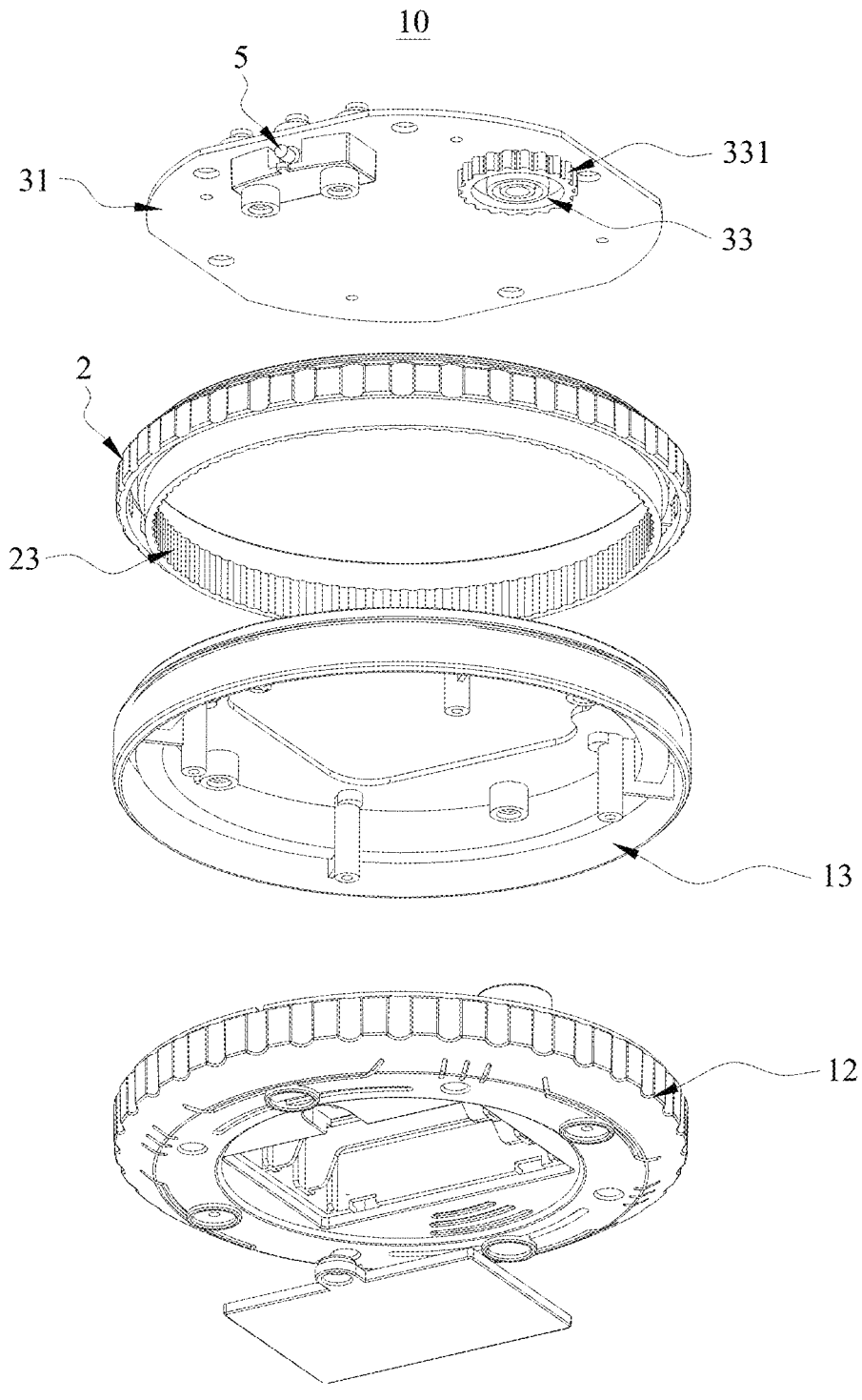
FIG. 4 is a partially schematic structural diagram of the chessboard toy shown in FIG. 3, viewed in another angle.
Figure 5:
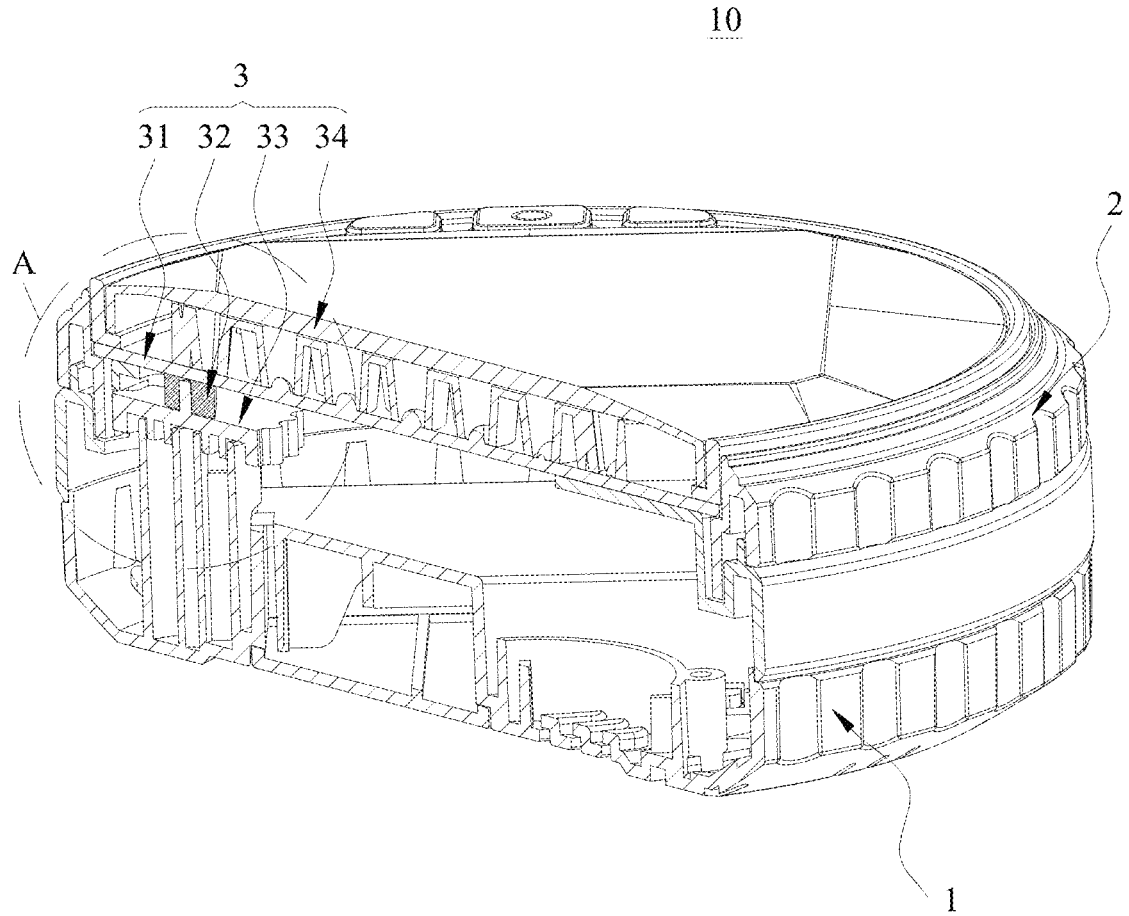
FIG. 5 is an internally schematic structural diagram of a chessboard toy in some embodiments of the present disclosure.

As shown in FIG. 3, FIG. 4, and FIG. 6, in some embodiments of the chessboard toy 10, the housing 1 includes a bottom shell 12, an upper cover 13, and a limiting ring 14. The upper cover 13 is arranged on the bottom shell 12. The upper cover 13 and the bottom shell 12 are jointly enclosed to form a storage cavity 20. The rotation member 33 is located in the storage cavity 20.

A boss 131 is arranged on a surface of the upper cover 13 that is away from the bottom shell 12. A mounting hole 132 is formed in the boss 131. The circuit board 31 is arranged on the boss 131 and is at least partially exposed inside the mounting hole 132. The knob 2 is sleeved on the boss 131. The limiting ring 14 is located on the circuit board 31. The screen display assembly 34 is located inside the limiting ring 14. A connection column 344 of the screen display assembly 34 is threaded in the circuit board 31 and is connected to the upper cover 13. The screen display assembly 34 resists against the limiting ring 14. The limiting ring 14 resists against the circuit board 31 and is clamped with the screen display assembly 34.

It can be understood that the storage cavity 20 is configured to encapsulate a moving component such as the rotation member 33 and block external foreign matter interference. The boss 131 is configured to lift a mounting plane of the circuit board 31 to avoid interference with the movement of the rotation member 33. The mounting hole 132 is configured to expose a partial region of the circuit board 31, which facilitates electrical connection between the circuit board 31 and other electrical elements and power sources. The limiting ring 14 achieves an effect of resisting against the circuit board 31, also achieves an effect of protecting a periphery of the screen display assembly, and can prevent the light from accidentally leaking from the periphery of the screen display assembly. The connection column 344 is threaded in the circuit board 31 and is configured to mechanically fix a relative position between the screen display assembly 34 and the upper cover 13.

Figure 10:
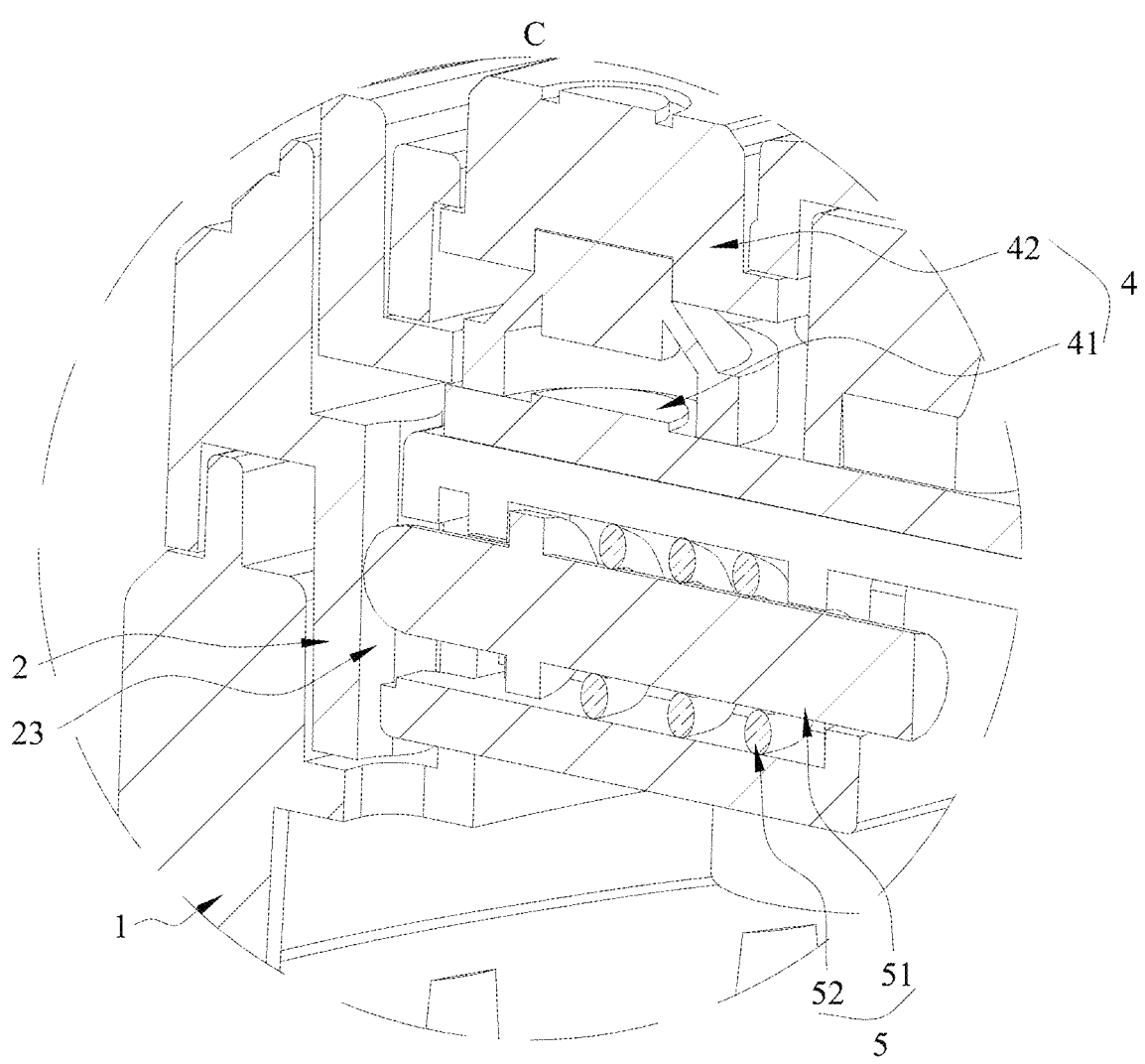
FIG. 10 is an enlarged view of part C of the chessboard toy shown in FIG. 9.

As shown in FIG. 1, in some embodiments of the chessboard toy 10, the chessboard toy 10 further includes a control device 4. Referring to FIG. 3 and FIG. 10 together, the control device 4 includes a control switch 41 and a button 42. The control switch 41 is arranged on the circuit board 31. The button 42 is slidably arranged on the housing 1 or the screen display assembly 34. The button 42 movably resists against the control switch 41.

It can be understood that the control switch 41 is configured to be turned on or turned off under a resisting pressure of the button 42, thereby generating a corresponding electrical signal to the circuit board 31. The button 42 is configured to transmit a mechanical pressure generated by a sliding operation of the user to the control switch 41.

It should be noted that using the content of this embodiment can expand interaction manners of the chessboard toy 10 (such as a confirm/cancel operation, a brightness control operation, and a volume control operation), to enhance diversity of operations.

Figure 9:
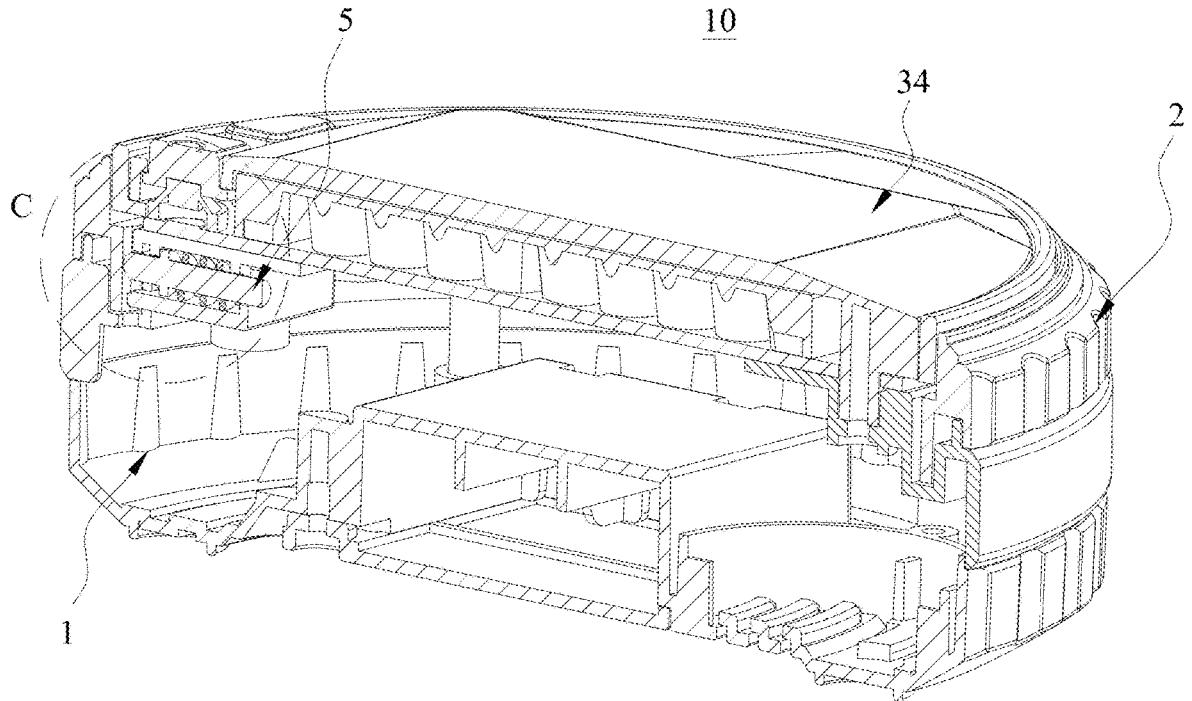
FIG. 9 is an internally schematic structural diagram of a chessboard toy in some embodiments of the present disclosure, viewed in another angle.

As shown in FIG. 4 and FIG. 9, in some embodiments of the chessboard toy 10, the chessboard toy 10 further includes a response device 5. Referring to FIG. 10 together, the response device 5 includes a response sliding column 51 and a reset spring 52. The response sliding column 51 is slidably arranged on the housing 1. The reset spring 52 is sleeved on the response sliding column 51. The reset spring 52 is configured to provide a force to drive the response sliding column 51 to slidably resist against the first driving coil 23.

It can be understood that the reset spring 52 is configured to provide a continuous elastic restoration force to the response sliding column 51, so that the response sliding column 51 always has a tendency to slide toward the first driving coil 23. The response sliding column 51 is configured to resist against the first driving coil 23 under the driving of the reset spring 52 to transmit a mechanical resistance to the knob 2.

Certainly, if a surface contour of the first driving coil 23 has a highly undulating structure, during the rotation of the knob 2, the response sliding column 51 can form an impact on a lower part of the first driving coil 23 to emit sounds, thereby further enriching feedback of an operation performed by the user on the knob 2.

In some embodiments of the chessboard toy 10, the response sliding column 51 is located inside the housing 1. A response hole is formed in the housing 1. The response hole is aligned with the first driving coil 23. The response sliding column 51 is threaded in the response hole.

It can be understood that the response hole is configured to create a space for the response sliding column 51 to resist against the first driving coil 23. The guide effect of the response hole and the threading of the response sliding column 51 eliminate an angle deviation of the response sliding column 51 during sliding, which ensures consistency of a direction of a mechanical feedback force and avoids non-uniform resistance or component wear caused by skewing friction.

Figure 11:
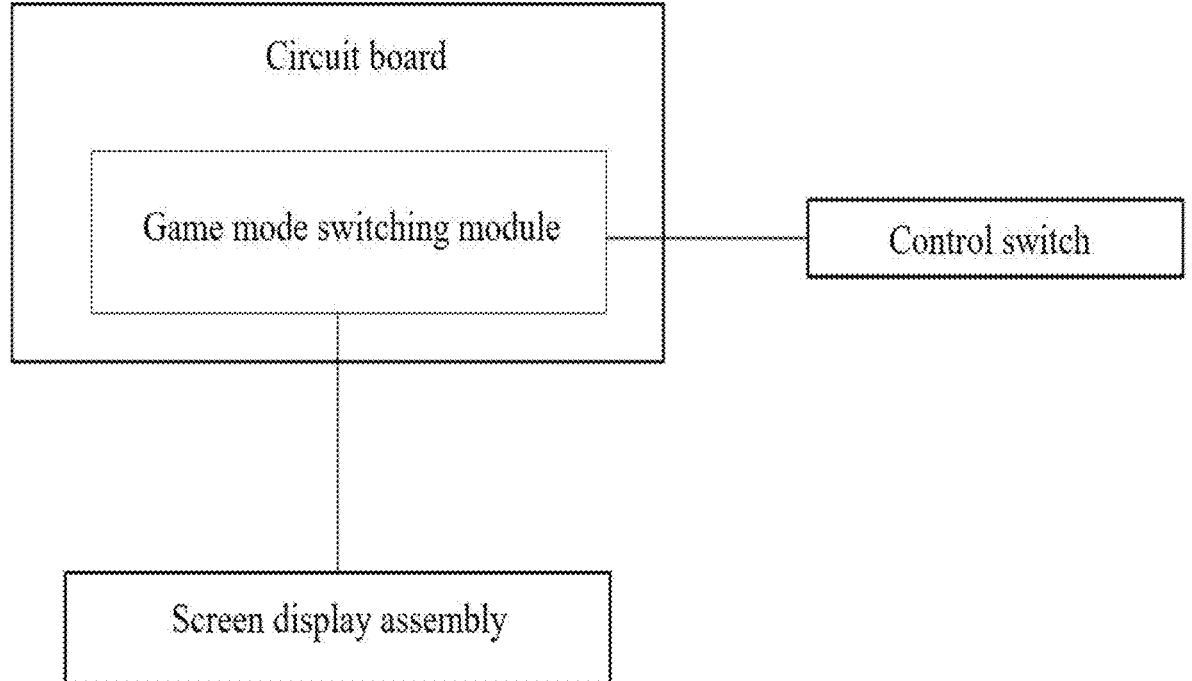
FIG. 11 is a schematic structural diagram of a control device and a sensing feedback device in some other embodiments of the present disclosure.
Figure 12:
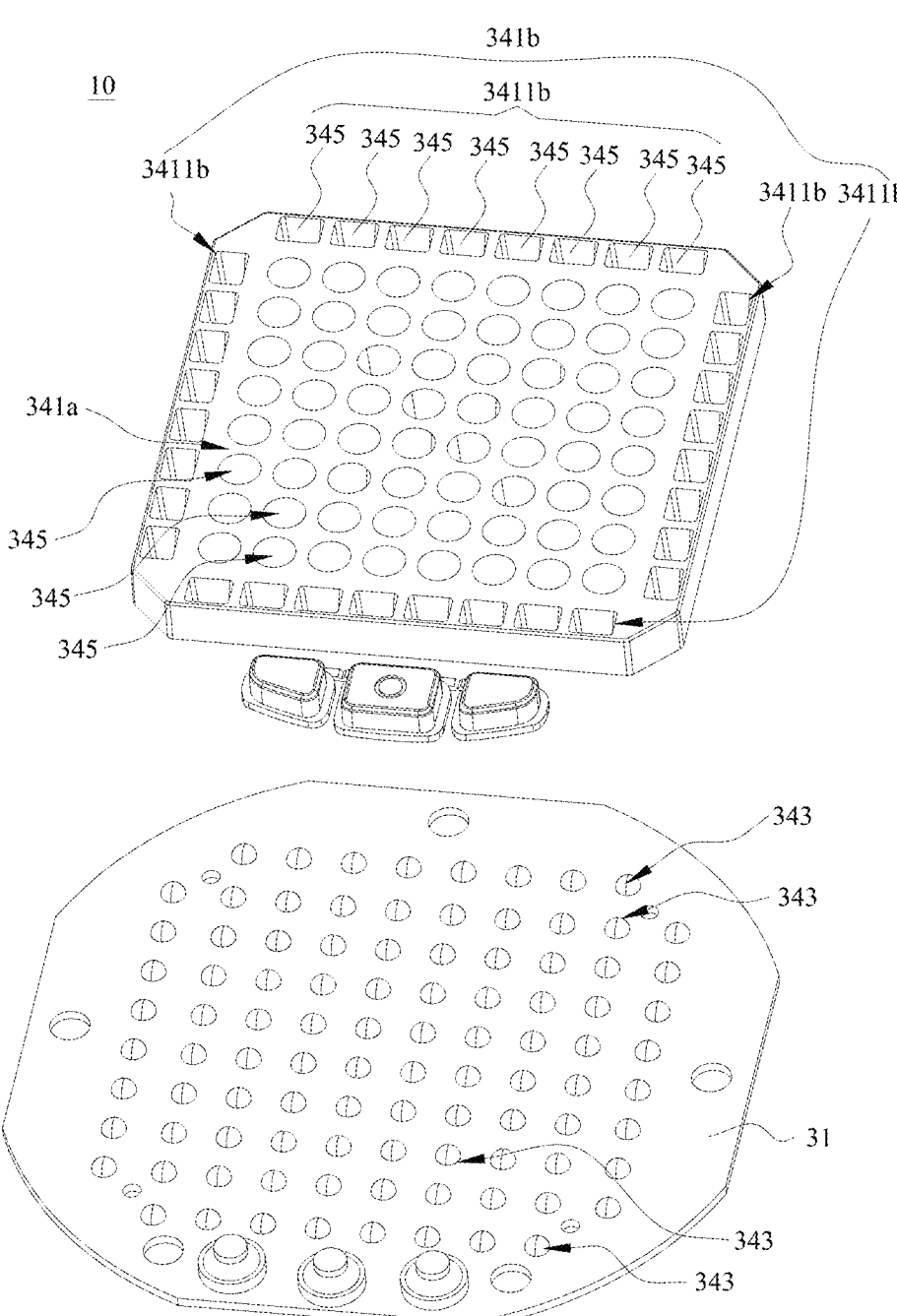
FIG. 12 is a partially schematic structural diagram of a chessboard toy in some other embodiments of the present disclosure.

As shown in FIG. 10 to FIG. 12, the control device 4 includes a plurality of control switches 41 and a plurality of buttons 42. The control switches 41 are arranged on the circuit board 31. The buttons 42 are respectively slidably arranged on the housing 1. The buttons 42 movably resist against the control switches 41 in a one-to-one correspondence manner. The circuit board 31 is provided with a game mode switching module 31. The game mode switching module 31 is electrically connected to the screen display assembly 34. At least one of the control switches 41 is configured as a function switch. The function switch is electrically connected to the game mode switching module. Certainly, all the control switches 41 can be configured as function switches. Certainly, some control switches 41 can be configured to have a game mode switching control function in an operation interface or an operation stage.

In the embodiments, specifically configuring a quantity of control switches 41, positions of the control switches 41, and a control switch 41 (or several control switches 41) in an operation interface, or a control switch 41 (or several control switches 41) in an operation stage to have the game mode switching control function can be flexibly set. The quantity, position, and different operation stages of during use do not limitations on the game mode switch.

Further, referring to FIG. 12, in some embodiments, the light guide member 341 can be configured to include an inner region and an outer region. A plurality of light guide channels 345 are formed in the inner region 341a, and are arranged in an equidistant array. For example, the light guide channels 345 can be arranged in a plurality of columns with equal spacings between adjacent columns. A quantity of light guide channels 345 in each column is the same.

A plurality of prompt zones 3411b are provided in the outer region 341b. A plurality of equally spaced light guide channels 345 are arranged in each prompt zone 3411b.

Further, the light guide channels 345 in the inner region can be arranged uniformly in an 8*8 manner, so that the inner region is rectangular. There may be four prompt zones 3411b which are in one-to-one correspondence to rectangular edges of the rectangular inner region. Moreover, eight light guide channels 345 are arranged in each prompt zone 3411b. In this way, each light guide channel 345 in the inner region can correspond to the light guide channels 345 in the prompt zones 3411b in a longitudinal or transverse direction. It should be noted that each light guide channel 345 corresponds to one LED 343 and plays a role in correspondingly guiding light.

Still further, the chessboard toy 10 can be configured to at least have one or more of the following game modes:

In a first mode: when the LEDs 343 corresponding to the inner region 341a work and emit light, a small square grid in a prompt zone 3411b can be lit up (i.e. the LEDs 343 corresponding to a light guide channel 345 in a prompt zone 3411b is lit up), and a light color presented by the small square grid can be flexibly set. In this case, the user rotates the knob 2. In a rotation direction of the knob 2, the light guide channels 345 in the outer region 341b can be lit up one by one. After one LED 343 is lit up, another previously lit LED may be extinguished. That is, the LEDs 343 in the outer region 341b may be switched to be lit up one by one in the same direction as the rotation direction of the knob 2. Subsequently, on the screen display assembly 34, the LEDs in the outer region 341b can form striking points (positions of the striking points are controlled by the knob 2), and the striking points achieve a striking effect on the screen display assembly, depending on sequential flashing of the LEDs in the inner region 341a. The striking effect is that a color of the inner region 341a will change with the striking. For example, working states of the LEDs in the inner region 341a are sequentially switched between emitting red light, emitting yellow light, emitting blue light, emitting green light, and extinguishing. Further, in this game mode, a quantity of LEDs 343 lit up in the inner region 341a to display a to-be-struck state can gradually increase, that is, a pattern displayed as the to-be-struck state on the screen display assembly 34 can be gradually enlarged. When the pattern in the to-be-struck state approaches or covers the outer region 341b, it is determined that the game is over.

In a second mode: when the inner region 341a is lit up in its color, a small square grid in the prompt zones 3411b is also lit up. A color presented in the small square grid is random. A player needs to rotate the knob 2. The small square grid on the screen display assembly can move around an outer circle with the rotation, that is, the LEDs corresponding to the outer region 341b can be switched to be lit up one by one. When the lit-up small square grid on the screen display assembly moves to correspond to a color of a central prompt zone 3411b in the same transverse column or the same longitudinal column, after a confirm key is clicked, the lit-up small square grid in the outer region 341b on the screen display assembly can move transversely or longitudinally and correspond to the color of the display area. If the light color of the moving lit-up small square grid is the same as the color of an LED to be collided, they will be automatically eliminated. As time goes on, the difficulty becomes higher and higher. If a central prompt circle reaches the outer circle and is not eliminated, it indicates that this battle fails. Then, a new battle starts.

In a third mode: the LEDs in the inner region 341a are selected through the knob 2. The green color means that there is no land mine up, down, left, and right, the yellow color means that there are land mines nearby, and the red color means that there is a land mine. A failure indicates end of the game. A quantity of land mines increases as a quantity of game levels increases.

In a fourth mode: the game starts. The game will win if there are five LEDs 343 of the same color in a transverse column and a longitudinal column that are intersected.

The present disclosure has the following beneficial effects:

The present disclosure relates to the chessboard toy. The first driving coil is arranged on the inner ring of the knob, and the second driving coil is arranged on the rotating member; and the first driving coil and the second driving coil mesh with each other, so that the rotation sensing member can be controlled by direct mechanical transmission; mechanical motion of the knob can be converted into an electrical signal of the rotation sensing member; and use of a light sensing mechanism or a magnetic sensing mechanism is avoided. Therefore, structural complexity and a fault rate are reduced. In addition, compared with the light sensing mechanism and the magnetic sensing mechanism that have high costs, a technical solution can also significantly reduce production and manufacturing costs.

The solutions of the present disclosure have been described in more details above with reference to the accompanying drawings. In the foregoing embodiments, the description of each embodiment has respective focuses. For a part that is not described in detail in an embodiment, reference may be made to related descriptions in other embodiments. Those skilled in the art should also be aware that the actions and modules involved in this specification may not be necessary for the present disclosure. Furthermore, it can be understood that the steps in the method of the embodiments of the present disclosure can be sequentially adjusted, merged, and deleted according to actual needs. The modules in the device of the embodiments of the present disclosure can be merged, partitioned, and deleted according to actual needs.

The above has described the various embodiments of the present disclosure. The above explanation is exemplary, not exhaustive, and is not limited to the various embodiments disclosed herein. Many modifications and changes are obvious to those of ordinary skill in the art without deviating from the scope and spirit of the various embodiments described herein. The selection of the terms used herein aims to best explain the principles and practical applications of the various embodiments or improvements to technologies in the market, or to enable other persons of ordinary skill in the art to understand the various embodiments disclosed herein.

What is claimed is:

1. A chessboard toy, comprising:
a housing;
a knob rotatably arranged on the housing, wherein an outer ring of the knob is exposed out of the housing; an inner ring of the knob is provided with a first driving coil and is exposed inside the housing; and
a sensing feedback device comprising a circuit board, a rotation sensing member, a rotation member, and a screen display assembly, wherein the circuit board is arranged inside the housing; the rotation sensing member is arranged inside the housing and is electrically connected to the circuit board; the rotation member is rotatably connected to an input end of the rotation sensing member; the rotation member is provided with a second driving coil which meshes with the first driving coil; the screen display assembly is electrically connected to the circuit board and is exposed out of the housing; and
when the knob is rotated, the first driving coil drives the second driving coil to rotate, so that the second driving coil drives the rotation member to rotate, and then the rotation sensing member outputs an electrical signal to the circuit board through the rotation member.

2. The chessboard toy according to claim 1, wherein the first driving coil comprises a first tooth ring; the second driving coil comprises a second tooth ring; the first tooth ring meshes with the second tooth ring; or
the first driving coil comprises a first annular wave pattern; the second driving coil comprises a second annular wave pattern; and the first annular wave pattern meshes with the second annular wave pattern.

3. The chessboard toy according to claim 1, wherein the housing is provided with an annular slot; an avoidance hole is formed in a slot wall of the annular slot;
the knob comprises an outer ring portion and an inner ring portion; the first driving coil is arranged on the inner ring portion; the outer ring portion is connected to the inner ring portion; the outer ring portion is exposed out of the housing; the inner ring portion is inserted into the annular slot; and the first driving coil is at least partially exposed in the avoidance hole to mesh with the second driving coil.

4. The chessboard toy according to claim 1, wherein the screen display assembly comprises a light guide member, a transmitting plate, and a plurality of light-emitting diodes (LEDs); the LEDs are respectively arranged on the circuit board; the light guide member is arranged on the circuit board and covers the LEDs; and the transmitting plate is arranged on the housing and blocks the light guide member.

5. The chessboard toy according to claim 4, wherein the LEDs are uniformly distributed; a plurality of light guide channels are formed in the light guide member; the light guide channels are aligned with the LEDs in a one-to-one correspondence manner; each LED is exposed inside each light guide channel; and the transmitting plate blocks end portions of the light guide channels.

6. The chessboard toy according to claim 1, wherein the housing comprises a bottom shell, an upper cover, and a limiting ring; the upper cover is arranged on the bottom shell; the upper cover and the bottom shell are jointly enclosed to form a storage cavity; the rotation member is located in the storage cavity;
a boss is arranged on a surface of the upper cover that is away from the bottom shell; a mounting hole is formed in the boss; the circuit board is arranged on the boss and is at least partially exposed inside the mounting hole; the knob is sleeved on the boss; the limiting ring is located on the circuit board; the screen display assembly is located inside the limiting ring; a connection column of the screen display assembly is threaded in the circuit board and is connected to the upper cover; the screen display assembly resists against the limiting ring; and the limiting ring resists against the circuit board and is clamped with the screen display assembly.

7. The chessboard toy according to claim 1, wherein the rotation sensing member comprises an encoder; a driving shaft is arranged on the rotation member; and the driving shaft is inserted into an input end of the encoder.

8. The chessboard toy according to claim 1, wherein the chessboard toy further comprises a control device; the control device comprises a control switch and a button; the control switch is arranged on the circuit board; the button is slidably arranged on the housing or the screen display assembly; and the button movably resists against the control switch.

9. The chessboard toy according to claim 8, wherein the control device comprises a plurality of control switches and a plurality of buttons; the control switches are arranged on the circuit board; the buttons are respectively slidably arranged on the housing; the buttons movably resist against the control switches in a one-to-one correspondence manner;
the circuit board is provided with a game mode switching module; the game mode switching module is electrically connected to the screen display assembly;
at least one of the control switches is configured as a function switch; and the function switch is electrically connected to the game mode switching module.

10. The chessboard toy according to claim 1, wherein the chessboard toy further comprises a response device; the response device comprises a response sliding column and a reset spring; the response sliding column is slidably arranged on the housing; the reset spring is sleeved on the response sliding column; and the reset spring is configured to provide a force to drive the response sliding column to slidably resist against the first driving coil.

* * * * *